United States Patent [19]

Baumgartner

[11] Patent Number: 4,793,756

[45] Date of Patent: Dec. 27, 1988

[54] TAPPING SCREW

[75] Inventor: Albert Baumgartner, Kriessern, Switzerland

[73] Assignee: SFS Stadler AG, Heerbrug, Switzerland

[21] Appl. No.: 918,776

[22] Filed: Oct. 14, 1986

[30] Foreign Application Priority Data

Oct. 24, 1985 [AT] Austria ................................. 3082/85

[51] Int. Cl.⁴ .......................................... F16B 25/02
[52] U.S. Cl. .................... 411/387; 408/228
[58] Field of Search ................ 411/387, 386, 417–421; 408/227–229

[56] References Cited

U.S. PATENT DOCUMENTS

| | | | |
|---|---|---|---|
| 2,165,011 | 7/1939 | Rosenberg | 411/420 |
| 3,942,406 | 3/1976 | Egner | 411/386 X |
| 4,069,730 | 1/1978 | Gutshall | 411/417 X |
| 4,161,132 | 7/1979 | Eklund et al. | 411/417 |
| 4,295,768 | 10/1981 | Skierski | 411/387 |
| 4,407,620 | 10/1983 | Shinjo | 411/387 |
| 4,679,968 | 7/1987 | Tsujimura et al. | 408/228 X |

FOREIGN PATENT DOCUMENTS

| | | | |
|---|---|---|---|
| 7604239 | 10/1976 | Netherlands | 411/387 |
| 1215171 | 12/1970 | United Kingdom | 411/387 |
| 1316157 | 5/1973 | United Kingdom | 411/387 |

Primary Examiner—Lloyd A. Gall
Attorney, Agent, or Firm—Toren, McGeady & Associates

[57] ABSTRACT

A tapping screw includes a screw head, a self-tapping thread portion and a drilling point. The drilling point has a pair of approximately axially extending flutes which are located diametrically opposite each other relative to the shank axis and include clearing surfaces and cutting surfaces. The cutting surfaces end in cutting edges facing the point of the screw and lateral outer knives. Immediately adjacent the cutting edges or cutting knives, the cutting surfaces have a convexly arched cross-sectional shape.

4 Claims, 1 Drawing Sheet

U.S. Patent  Dec. 27, 1988  4,793,756
SFS Stadler AG
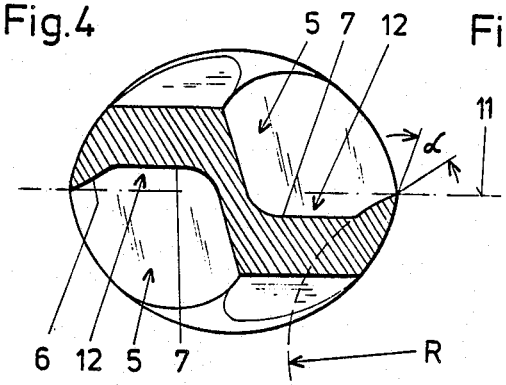
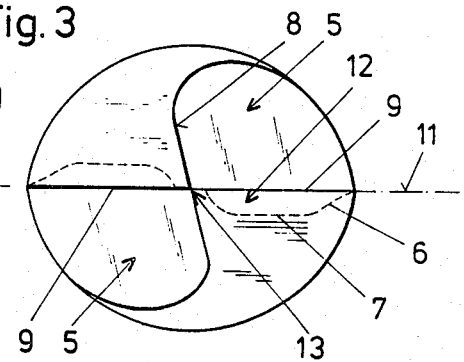
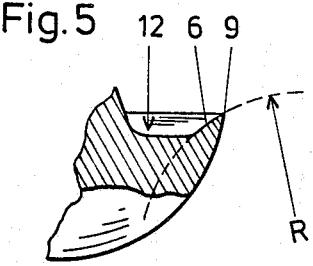
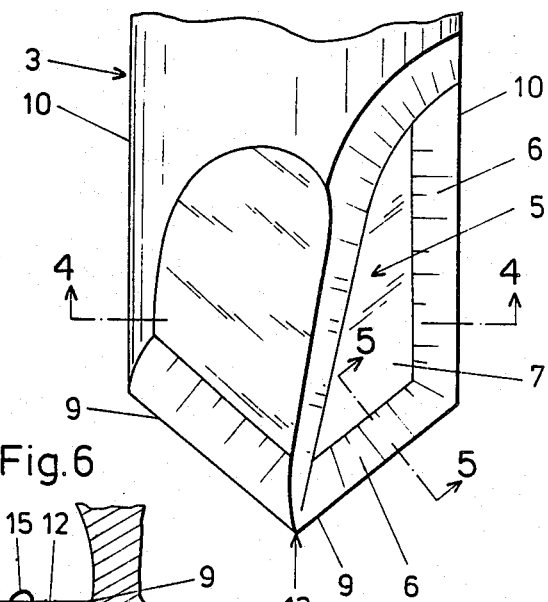
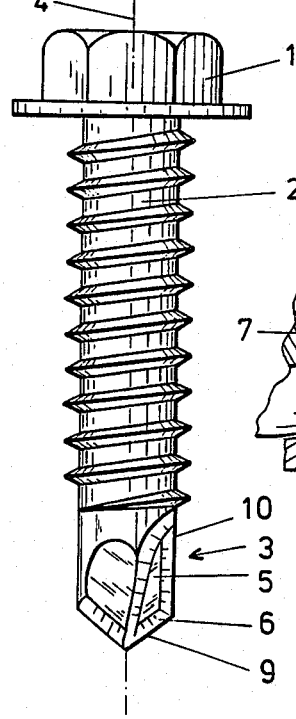
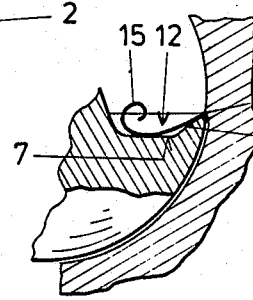
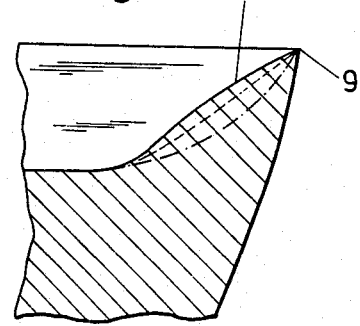

TAPPING SCREW

BACKGROUND OF THE INVENTION

1. Field of the Invention

The invention relates to a tapping screw including a head, a self-tapping thread portion and a drilling point. The drilling point has a pair of approximately axially extending flutes which are located diametrically opposite each other relative to the shank axis and include clearing surfaces and cutting surfaces. The cutting surfaces end in cutting edges facing the point of the screw and lateral outer cutting knives. With respect to a plane extending through a cutting edge and the corresponding cutting knives, each flute defines a concavely rearwardly arched indentation.

2. Description of the Prior Art

Tapping screws of the above-described type have become known in various embodiments. Since the cutting surfaces located immediately adjacent the cutting edges or cutting knives of these tapping screws are concavely arched, the cutting knives or cutting edges may break, particularly if relatively hard materials are to be drilled. In addition, the chips removed by drilling may stick to the cutting surfaces and may fail to separate from the sides of the approximately axially extending flutes. This may lead to difficulty because the cutting efficiency of the drilling tip is reduced. Consequently, a drilling point damaged in the manner described above or clogged with chips may make it impossible to conclude the drilling procedure, so that possibly new screws are needed for use in the same borehole.

Therefore, it is the primary object of the present invention to provide a tapping screw in which the drilling efficiency is substantially increased and in which the danger of breakage of the cutting edges or cutting knives and sticking of chips to he cutting surfaces is practically eliminated.

SUMMARY OF THE INVENTION

In accordance with the present invention, immediately adjacent the cutting edges or cutting knives, the cutting surfaces have a convexly arched cross-sectional shape, preferably having the shape of a circle.

The circular convex shape of the cutting surfaces results in a stiffening of the cutting edges and the cutting knives without reducing the efficiency of the drilling procedure. The convexly arched shape of the cutting surfaces further results in a substantial improvement of the chip guidance of the removed material because the cutting surfaces are arched in the opposite direction of the chips which are being removed, so that the chips are separated from the cutting surfaces during cutting. In other words, the chips do not follow the contours of the cutting surfaces. This results in an optimum drilling procedure and an optimum chip removal into the hollow spaces formed by the flutes.

The specific feature of the present invention according to which the convexly arched portions of the cutting surfaces have a circular convexly arched cross-sectional shape results in an optimum reinforcement of the cutting edges or cutting knives and also in a simple working of the tool for manufacturing the drilling point. In addition, the circular arch shape results in a safe removal of the drill chips from the border of the flutes.

In accordance with the present invention, it is further suggested that the convexly arched portions of the cutting surfaces each extend over the entire length of a unit defined by the cutting edge and the cutting knives. As a result, the entire section of the drilling point in which a chip removal during drilling is possible, a reinforcement of the cutting edges or cutting knives is obtained and an optimum chip removal is ensured.

In accordance with another advantageous embodiment of the tapping screw according to the invention, the cutting edges end at the point of the screw without a cross-cutting edge. This results in a significantly improved centering of the screw, so that the screw does not migrate during the start-up of the drilling procedure. Consequently, the drilling efficiency of the tapping screw is further improved.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there is illustrated and described a preferred embodiment of the invention.

BRIEF DESCRIPTION OF THE DRAWING

In the drawing:

FIG. 1 is a front elevational view of a tapping screw according to the invention;

FIG. 2 is a partial view of the drilling point, on a larger scale, of the tapping screw illustrated in FIG. 1;

FIG. 3 is a bottom view of the drilling point;

FIG. 4 is a sectional view of the tapping screw taken along sectional line, 4—4 of FIG. 2;

FIG. 5 is a sectional view taken along sectional line 5—5 of FIG. 2;

FIG. 6 is the same sectional view as FIG. 5, but with a chip shown as it is being cut;

FIG. 7 shows the cutting surface of the drilling point as in FIG. 5, but on an even larger scale.

DETAILED DESCRIPTION OF THE INVENTION

The tapping screw illustrated in FIG. 1 includes a screw head 1 whose shape may be formed in accordance with the field of application of the screw. The screw further includes a self-tapping thread 2 as well as a drilling point 3. The drilling point 3 has a pair of approximately axially extending flutes 5 which are located diametrically opposite one another relative to axis 4 of the screw shaft. The flutes 5 are defined by cutting surfaces 6 and clearing surfaces 7 and 8. The cutting surfaces 6 continue into cutting edges 9 facing the screw tip and in lateral outer cutting knives 10. The flutes 5 form a concavely rearwardly arched indentation with respect to a plane 11 extending through a cutting edge 9 and a cutting knife 10.

The significant feature of the present invention resides in the fact that, immediately adjacent the cutting edges 9 and the cutting knives 10, the cutting surfaces 6 have a convexly arched shape. This results in a reinforcement of the cutting portions of the drilling point 3, while the cutting efficiency remains excellent.

The reinforced portions of the drilling point are particularly clearly illustrated in FIG. 7. A conventional, concavely extending cutting surface is shown in a dash-dot line. A possible plane cutting surface is shown in a broken line. Compared to these two cutting surfaces, a convexly arched cutting surface 6 results in a reinforcement of the cutting portions, so that the cutting edges will not break and the drilling efficiency will not be reduced.

As can be seen particularly from FIG. 6, the convexly arched cutting surface 6 causes the removed chip 15 to be separated from the indented portion 12 even before the chip reaches the clearing surface 7. As a result, the chip 15 will not stick to the cutting surfaces.

The convexly arched portions f the cutting surfaces 6 each extend continuously along the entire length of a unit defined by cutting edge 9 and cutting knives 10, so that the same conditions exist along the entire length of the cutting area intended for the drilling procedure.

The convexly arched portion of the cutting surface 6 has a circular cross-sectional shape. The radius R of this circle is illustrated in FIGS. 4 and 5. The size of this radius may be selected in accordance with the field of application in which the tapping screw according to the invention is used. The angle α as shown in FIG. 4 adjacent the cutting edge 9 or the cutting knife 10 may vary in accordance with the size of radius R.

In view of the structural features of the tapping screw according to the invention, a simple tool for manufacturing the tapping screw, particularly for manufacturing the drilling point, can be used. The appropriate portions of the tool for manufacturing the screw can be produced by means of a round cutting disk having the radius R, wherein the cutting disk is guided on a track. This can be considered a substantial advantage in producing the tool for manufacturing the tapping screw according to the invention.

FIGS. 2 and 3 clearly show that in the illustrated example the cross cutter 13 is reduced to zero, that is, no cross cutter is provided. This results in an improved centering of the screw and prevents migration during the start-up of the drilling procedure. In addition, the drilling efficiency is further improved.

Of course, the features according to the present invention can also be used in tapping screws in which a cross cutter is provided, i.e., in which the successive cutting edges 9 and the oppositely located cutting knives 10 are not located n the same plane 11. When the primary cutters are laterally offset, the cross cutter 13 becomes larger accordingly. Depending upon the field of application of the tapping screw, a certain magnitude of the cross cutter 13 is desirable or a cross cutter reduced to zero may be advantageous.

The remaining features of the tapping screw illustrate in FIG. 1 are those of conventional tapping screws, that is, the shape of the thread and the shape of the head may vary according to the field of application. It is also conceivable to provide the convexly arched cutting surface with a non-circular shape, however, this would make the production of the tools for manufacturing the screw more difficult.

The significant feature of the tapping screw according to the invention is the fact that, immediately adjacent the cutting edges 9 and cutting knives 10, the cutting surfaces 6 have a convexly arched shape.

While a specific embodiment of the invention has been shown and described in detail to illustrate the application of the inventive principles, it will be understood that the invention may be embodied otherwise without departing from such principles.

I claim:

1. A tapping screw comprising a head, a self-tapping thread portion connected to the head and a drilling point connected to the thread portion, the drilling point defining a pair of approximately axially extending flutes located diametrically opposite each other relative to the screw axis and forming clearing surfaces and cutting surfaces, wherein the cutting surfaces end in cutting edges tapered toward the point of the screw and in lateral outer cutting knives parallel to the axis of the screw, and wherein, with respect to a plane extending through a cutting edge and a corresponding cutting knife, each flute defines an essentially concavely rearwardly arched indentation, wherein the improvement comprises that, immediately adjacent the cutting edges and cutting knives, the cutting surfaces have a convexly arched cross-sectional shape.

2. The tapping screw according to claim 1, wherein the cross-sectional shape of the cutting surface is circular.

3. The tapping screw according to claim 1, wherein the convexly arched portions of the cutting surfaces each extend over the entire length of a unit defined by the cutting edges and the cutting knives.

4. The tapping screw according to claim 1, wherein the cutting edges end at the drilling point without defining a cross cutter.

* * * * *